United States Patent
Honeycutt

(10) Patent No.: US 7,056,970 B2
(45) Date of Patent: Jun. 6, 2006

(54) DECREASING ALLERGENICITY OF NATURAL LATEX RUBBER PRIOR TO VULCANIZATION

(75) Inventor: Travis Honeycutt, Flowery Branch, GA (US)

(73) Assignee: Vystar,LLC, Gainesville, GA (US)

( * ) Notice: Subject to any disclaimer, the term of this patent is extended or adjusted under 35 U.S.C. 154(b) by 18 days.

(21) Appl. No.: 11/096,421

(22) Filed: Apr. 4, 2005

(65) Prior Publication Data

US 2005/0277722 A1    Dec. 15, 2005

Related U.S. Application Data

(63) Continuation-in-part of application No. 10/176,244, filed on Jun. 19, 2002, now Pat. No. 6,906,126.

(51) Int. Cl.
*C08K 3/10*    (2006.01)

(52) U.S. Cl. .................................................. 524/437

(58) Field of Classification Search ............... 524/430, 524/437
See application file for complete search history.

(56) References Cited

U.S. PATENT DOCUMENTS

| 5,563,241 A | * | 10/1996 | Beezhold ................... 528/482 |
| 5,910,567 A | | 6/1999 | Tanaka et al. ......... 264/331.13 |
| 5,998,512 A | | 12/1999 | Schloman et al. |
| 6,380,283 B1 | * | 4/2002 | Perrella et al. ................ 524/31 |

FOREIGN PATENT DOCUMENTS

JP    11012306 A1    1/1999

* cited by examiner

*Primary Examiner*—Peter D. Mulcahy
(74) *Attorney, Agent, or Firm*—Dergosits & Noah LLP

(57) ABSTRACT

A method for reducing allergenicity of natural latex rubber. The natural latex rubber, prior to its vulcanization, is admixed with aluminum hydroxide to denature the antigenic protein thus reducing the total protein level considerably. Lignin or fumed silica can also be mixed with the aluminum hydroxide to reduce the protein value in latex. Ideally, the aluminum hydroxide is characterized as having a density of approximately 2.42 g/cm$^3$ and molecular weight of 78.00.

13 Claims, No Drawings

DECREASING ALLERGENICITY OF NATURAL LATEX RUBBER PRIOR TO VULCANIZATION

RELATED APPLICATIONS

This application is a continuation in part of U.S. application Ser. No. 10/176,244 filed on Jun. 19, 2002 now U.S. Pat. No. 6,906,126.

TECHNICAL FIELD

The present invention relates to a method of reducing the allergenicity of natural latex rubber prior to its vulcanization. In doing so, the potential for allergic reactions due to the protein content of the natural latex rubber has been greatly reduced while maintaining its desirable physical properties when used in such products as latex gloves and similar medical and consumer goods.

BACKGROUND OF THE INVENTION

Beginning in the late 1980's allergic reactions associated with the use of latex gloves began to receive widespread recognition. These reactions varied greatly in degree but seemed to exhibit similar characteristics to acquired sensitivity reactions seen with other allergens. Although latex gloves have enjoyed a long history of usage dating back to the 1800's, the perceived need for protection from AIDS and HIV exposure during the 80's caused a tremendous increase in the use of gloves. This, in turn, resulted in a much-heightened exposure to the naturally occurring antigenic proteins contained in raw latex.

The last decade and a half has seen a great change in latex use as a result of publicity concerning these allergies. Today in the U.S. there is almost universal awareness of the risks associated with repeated latex exposure, particularly in the healthcare fields where exposure is more profound. Awareness of the risks, however, extends into the industrial glove market, and even to the general public, who have received risk warnings from various government and health-watch groups. As a result there exists much interest in the market, fueling a strong trend to reduce exposure to latex-associated allergens.

Manufacturers have responded in several ways: 1) reduction or elimination of donning powder, 2) utilization of chlorinated glove washing and additional processing steps to reduce antigenic protein load, 3) use of coatings to reduce actual contact with latex, and 4) introduction of alternative materials that mimic, natural latex performance characteristics. Each of these industry reactions represents compromises either from ease of use, performance, or cost standpoint. In short, nothing beats the tactile, comfort, and barrier protection that is provided by natural latex products.

In the last ten years there has been an increasing awareness of the possible immunologic and other reaction risks associated with the use of latex gloves. This awareness is the result of the proliferation in glove usage among healthcare workers in order to avoid potential exposure to HIV/AIDS transmission sources.

An increase in the reported incidence of latex allergic sensitivity and other skin reactions has been concomitant with increased glove usage. This has spurred an effort by industry leaders and manufacturers to reduce exposure to latex. Glove makers have initiated latex substitution in the manufacturer of gloves, elimination of donning powder (antigenic proteins leach in to the cornstarch powder and become airborne-a source of respiratory exposure and subsequent sensitization), and the introduction of methods to reduce overall protein content of gloves.

Latex rubber in its natural form consists of polymer, long chain molecules consisting of repeating units of isoprene:

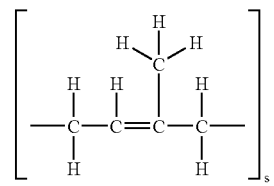

When it is harvested from the rubber tree, Hevea brasiliensis, the liquid, sticky substance also contains proteins like heavamine, hevein, and rubber elongation factor (REF). Although the basic isoprene polymer is non-antigenic, the associated proteins are highly antigenic. It is important to note this difference in order to minimize the antigenic impact of natural latex without destroying its underlying structure.

In its natural state, natural latex does not possess characteristics that are commercially useful. In order to achieve utilitarian value, including strength, elasticity, and memory, the chains of isoprene must be cross-linked to one another. Depending on the type of rubber end product desired, this is achieved with either application of heat and sulfur, or in the case of latex rubber used in the manufacture of gloves, various chemical accelerators that donate or bind sulfur, thus speeding the cross-linking process. The major accelerators are thiurams, mercaptobenzothaizoles (MBTs), and carbamates.

In addition to accelerators, latex glove manufacturers utilize another class of additives, called sensitizers, which most frequently consist of substituted phenols. These substances are used to impede oxidation, and resultant degradation, of natural latex.

Foreign materials, natural latex proteins, accelerators, and sensitizers can all provoke human reactions, but the allergenic reactions due to the proteins are considered to be by far the most problematic in the healthcare field. The following briefly describes three major types of foreign material reactions most commonly associated with latex use:

Irritant dermatitis is skin irritation that does not involve the body's immune response, that is, it is not an allergic response. Frequent hand washing and inadequate drying, aggressive scrubbing technique or detergents, mechanical abrasive effect of powder, climatic irritation, and emotional stress can all cause this condition. Even though this is not an allergic reaction, irritant hand dermatitis can cause breaks in the skin which can facilitate entry of the sensitizing latex protein or chemicals found in the commercial product, and in turn lead to latex allergy.

Delayed cutaneous hypersensitivity (type IV allergy) is contact (hand) dermatitis generally due to the chemicals used in latex production. It is mediated via T-cells causing a skin reaction that is typically seen 6–48 hours after contact. The reaction is local and limited to the skin that has contact with the glove. While not life threatening, those with type IV allergy are at increased risk to develop type I allergy. As in irritant dermatitis, the broken skin barrier can provide an entry site in to the body for foreign materials. This can produce sensitization to latex proteins leading to a more serious type of reaction.

The third and potentially most serious type of reaction associated with latex use is a true IgE/histamine-mediated allergy to protein (also called immediate, or type I hypersensitivity). This type of reaction can involve local or systemic symptoms. Local symptoms include contact urticaria (hives), which appears in the area where contact occurred, i.e., the hands, but can spread beyond that area and become generalized. More generalized reactions include allergic rhinoconjunctivitis and asthma. The presence of allergic manifestations to natural latex indicates an increased risk for anaphylaxis, a rare but serious reaction experienced by some individuals who have developed an allergy to certain proteins (e.g., insect stings, natural rubber, penicillin). This type I reaction can occur within seconds to minutes of exposure to the allergen. When such a reaction occurs, it can progress rapidly from swelling of the lips and airways, to shortness of breath, and may progress to shock and death, sometimes within minutes. While any of these signs and symptoms may be the first indication of allergy, in many workers with continued exposure to the allergen, there is progression from skin to respiratory symptoms over a period of months to years. Some studies indicate that individuals with latex allergy are more likely than latex non-allergic persons to be atopic (have an increased immune response to some common allergens, with symptoms such as asthma or eczema). Once natural latex allergy occurs, allergic individuals continue to experience symptoms, which have included life-threatening reactions.

There are several classes of people known to be at increased risk for latex allergy. Medical patients who have had multiple hospitalizations and have been exposed numerous times to latex medical products, healthcare workers, and atopic individuals comprise this high-risk group. Current estimates are that 8–17% of healthcare workers become sensitized. Despite the recent emphasis on universal precautions, the marked increase in glove usage due to commutable disease prevention is largely blamed for the increase in latex allergies among these groups. Atopic individuals (those with other allergies or asthma) are at significantly greater risk to develop latex allergy than the general population. It is estimated that as many as 25–30% of atopic healthcare workers may become sensitized.

The problems presented by allergic reactions to latex are exacerbated by the proliferation and widespread use of latex-based products. Latex presents great risk to persons in the health care industry where latex products are used extensively in the form of gloves, casts, dressings, tapes, catheters, tubes, drains, airway management devices, med delivery, tourniquets, monitoring devices, and others. One persistent threat lies in the cornstarch powder used to lubricate and ease donning of rubber gloves. The proteins absorb onto the powder and become aerosolized during use and when the gloves are donned and removed.

Products containing latex are also found throughout the home in the form of balloons, art supplies, toys, swimming equipment, contraceptive devices, cosmetics, bottle nipples, pacifiers, clothing, chewing gum, rubber bands, and others. Groups at risk include particularly children with spina bifida, those who have been shown to have a very high risk of latex sensitivity, patients with congenital urologic abnormalities, healthcare providers and rubber industry workers.

Since the severe allergic reactions to latex are due to their naturally occurring proteins, the prior art offers little in the way of solutions. For example, "hypoallergenic" latex products are free from the vulcanization accelerator compounds that can cause dermatitis, but do not prevent immediate hypersensitivity reactions. Likewise, ammonia treatment of the natural rubber latex proteins can cause breakdown and precipitation of some latex proteins, but the allergenicity appears to be preserved and other antigenic latex proteins are unextractable. In short, the literature recommends that the only treatment available for latex allergy is avoidance.

The Food and Drug Administration (FDA), as well as other state and federal agencies, has received requests to ban the use of glove powder. It has been suggested that experimental and clinical studies demonstrate that glove powder on medical gloves can enhance foreign body reactions, increase infections and act as a carrier of natural latex allergens. The National Institute of Occupational Safety and Health (NIOSH) recently issued a safety alert recommending the use of powder-free, reduced protein content latex gloves to reduce exposure to natural latex proteins (allergens).

Experimental and clinical data demonstrate that natural rubber latex (NRL) proteins are allergenic. Further, natural latex proteins bind to cornstarch while aerosolized powder on NRL gloves is allergenic and can cause respiratory allergic reactions. Published studies support the conclusion that airborne glove powder represents a threat to individuals allergic to natural rubber latex and may represent an important agent for sensitizing non-allergic individuals. There are also published data (although limited) and clinical experience that cornstarch powder on NRL gloves may also be a contributing factor in the development of irritation and type IV allergy.

In addition to dusting powder, other lubricants may also be used in the manufacturing process. Latex and some polymers are tacky and gloves made of these materials stick to the mold or former. A mold-release lubricant such as calcium carbonate or a mixture of calcium carbonate and cornstarch is used to enable the removal of gloves from molds. The other side of the glove may be coated with a donning lubricant, such as cornstarch or silicone oils, to make donning gloves easier and to prevent gloves from sticking during the manufacturing process.

Over the past three years, the FDA has received requests to ban the use of all glove powders. These requests have been based on repeated clinical and experimental studies reporting that cornstarch on surgical gloves can damage tissue's resistance to infection, enhance the development of infection, serve as a potential source of occupational asthma, and provide a source of natural latex protein exposure to natural latex allergic individuals. The issues regarding the use of glove powder, except for the transport of natural latex protein allergens, apply to the use of glove powder on both natural rubber latex and synthetic gloves. Several states, acting on their own initiative have banned the sale and use of glove powders.

Thus, an object of the present invention is to teach a method of reducing the allergenicity of natural latex rubber prior to vulcanization to enable the creation of a commercial product relatively free of allergenicity with no apparent loss of physical properties.

SUMMARY OF THE INVENTION

The present invention is directed to a method of reducing allergenicity of natural latex rubber. The method comprises subjecting the natural latex rubber, prior to vulcanization, to aluminum hydroxide to reduce protein levels in it. It is preferred that at least approximately 0.01% aluminum hydroxide by weight is admixed with the natural latex rubber and, ideally, approximately 0.02–0.5% aluminum hydroxide by weight is employed. The aluminum hydroxide is admixed with the natural latex rubber for at least 30 minutes and, ideally 72 hours with agitation. The antigenic protein is denatured thus enabling the natural latex rubber to be further processed.

DETAILED DESCRIPTION OF THE INVENTION

As previously noted, the present invention involves a method of reducing allergenicity of natural latex rubber. The natural latex rubber is subjected to aluminum hydroxide and agitation to produce an intimate admixture. Ideally, at least approximately 0.01% aluminum hydroxide by weight is admixed with the natural latex rubber and, preferably, 0.02–0.5% aluminum hydroxide by weight is employed. Furthermore, lignin or fumed silica as previously described can be admixed with the aluminum hydroxide and natural latex prior to vulcanization to reduce the antigenic protein value.

Once the suitable admixture is created, it is found that at least 30 minutes, preferably 72 hours of agitation is required to enable appropriate denaturing of the antigenic protein content from the natural latex rubber whereupon, the treated latex containing denatured protein is vulcanization into a latex article.

Although there are various suitable candidates for use herein, it has been found that aluminum hydroxide having a density of approximately 2.42 g/cm$^3$ is ideal. Further, the aluminum hydroxide should preferably exhibit a molecular weight of approximately 78.00. It has been found that lignin having a density of from approximately 0.6 g/ml is ideal. Fumed silica having a density of from approximately 2.2 g/cm$^3$ and surface area of 255 m$^2$/g is ideal. After the protein has been denatured pursuant to the present invention, vulcanizing the latex is possible without disrupting the physical or chemicals properties of the natural latex rubber.

Experimental Data

A series of films were created, a first being a control sample of natural latex rubber not involving the teachings of the present invention. This material was applied to a glass plate.

A series of three additional films were created, in each instance, using the same natural latex rubber which was employed to make the above-reference film. 0.05% aluminum hydroxide by weight having a density of 2.42 g/cm$^3$ and molecular weight of 78.00 was mixture and agitated with the natural latex rubber for 72 hours. Next, this sample was processed into a film on a glass plate and labeled "RA-8". A second film was created labeled "RAL-1-2". Sample RAL-1-2 differed from sample RA-8 in that 0.5% lignin by weight having a density of 0.6 g/ml was mixed with 0.06% by weight aluminum hydroxide having a density of 2.42 g/cm$^3$ and natural latex rubber for 72 hours. Next, this sample was processed into a film on a glass plate. A third film was created labeled "RAFS-4". Sample RAFS-4 differed from the other samples in that 0.5% fumed silica by weight having a density of 2.2 g/cm$^2$ and surface area 255 m$^2$/g was mixed with 0.06% by weight aluminum hydroxide having a density of 2.42 g/cm$^3$ and natural latex rubber for 72 hours. Next, this sample was processed into a film on a glass plate. Films RA-8, RAL-1-2 and RAFS-4 were analyzed by conducting LEAP assays. The following results were measured noting that, in addition to the films, the control sample of latex film was also scrutinized.

ELISA Inhibition Assay (ASTM D6499-03). The data is expressed as antigenic latex protein in micrograms/gram of sample. The untreated liquid latex contained 636.3 μg/g while the control film from untreated liquid latex contained 33.0 μg/g of antigenic protein. The RA-8 liquid latex sample contained 12.1 μg/g of protein and latex film from the same sample contained 17.1 μg/g of antigenic protein. The RAL-1-2 liquid latex sample contained 12.3 μg/g of protein and the latex film from the same sample contained 0.4 μg/ml. The RAFS-4 liquid latex sample contained 12.3 μg/g of protein and latex film from the same sample contained 1.1 μg/g.

Two additional samples, identified as RAPL-10 and RAPL-11 were prepared. RAPL-10 had a sample weight of 11.5 g, an extract volume of 58 ml, an inhibition assay concentration of less than 0.03 mg/ml and a surface area 2.9 dm$^2$ when spread upon a planar surface. RAPL-10 consisted of natural latex rubber that was premixed with 0.15% (wt.) Al(OH)$_3$ in concentrated KOH and 0.50% (wt.) lignin, for 72 hours.

RAPL-11 had a sample weight of 10.5 g, an extract volume of 53 ml, an inhibition assay concentration of 0.2 mg/ml and a surface area of 2.9 dm$^2$ when spread upon a planar surface. RAPL-11 consisted of natural latex rubber that was pre-mixed for 72 hours with 0.20% (wt.) Al(OH)$_3$ in concentrated KOH and 0.50% (wt.) lignin prior to vulcanization. The antigenic protein levels of RAPL-10 and RAPL-11 were measured. RAPL-10 exhibited a level of less than 0.2 mg/g or 0.8 mg/ml and RAPL-11 exhibited a level of approximately 0.8 mg/g or 2.7 mg/ml.

It is quite apparent from the test data which was developed and reported above that dramatic reduction in protein levels is achieved by the relatively simple processes of denaturing protein found in natural latex rubber with aluminum hydroxide alone or with lignin and a fumed silica. All of these processes are employed prior to vulcanization of the natural latex rubber. In doing so, products can be produced while reducing risks imposed upon users of natural latex rubber products, including healthcare professionals, as a result of type I hypersensitivity. Most importantly, this is accomplished without diminishing the physical properties of natural latex rubber which makes commercial products made from this material so desirable.

The invention claimed is:

1. A method of reducing allergenicity of natural latex rubber, said method comprising subjecting said natural latex rubber, prior to its vulcanization, to aluminum hydroxide to reduce protein levels in said natural latex rubber.

2. The method of claim 1 wherein at least approximately 0.01% aluminum hydroxide is admixed with natural latex rubber for reducing said allergenicity.

3. The method of claim 1 wherein approximately 0.02–0.5% aluminum hydroxide is admixed with said natural latex rubber for reducing said allergenicity.

4. The method of claim 1 wherein approximately 0.1–5% lignin is admixed with said aluminum hydroxide and said natural latex rubber for reducing said allergenicity.

5. The method of claim 4 wherein said lignin is characterized as having a bulk density of approximately 0.6 g/ml.

6. The method of claim 1 wherein approximately 0.1–5% fumed silica is admixed with aluminum hydroxide and said natural latex rubber for reducing said allergenicity.

7. The method of claim 6 wherein said fumed silica is characterized as having a density of approximately 2.2 g/cm$^3$ and surface area of approximately 255 m$^2$/g.

8. The method of claim 1 wherein aluminum hydroxide is admixed with said natural latex rubber under agitation for a period of approximately 30 minutes to 72 hours prior to vulcanization.

9. The method of claim 4 wherein lignin is admixed with said natural latex rubber under agitation for a period of approximately 30 minutes to 72 hours prior to vulcanization.

10. The method of claim 6 wherein fumed silica is admixed with said natural latex rubber under agitation for a period of approximately 30 minutes to 72 hours prior to vulcanization.

11. A method of reducing allergenicity of natural latex rubber having antigenic protein, said method comprising admixing, prior to vulcanization, aluminum hydroxide and natural latex rubber, subjecting the admixture of natural latex rubber and aluminum hydroxide to agitation thus denaturing the antigenic protein.

12. A method of reducing allergenicity of natural latex rubber, said method comprising admixing, prior to vulcanization, aluminum hydroxide, lignin and natural latex rubber, subjecting the admixture of natural latex rubber, aluminum hydroxide and lignin to agitation thus denaturing said antigenic protein.

13. A method of reducing allergencity of natural latex rubber using antigenic protein, said method comprising admixing, prior to vulcanization, aluminum hydroxide, fumed silica and natural latex rubber, subjecting the admixture of natural latex rubber, aluminum hydroxide and fumed silica to agitation thus denaturing said antigenic protein.

\* \* \* \* \*

UNITED STATES PATENT AND TRADEMARK OFFICE
CERTIFICATE OF CORRECTION

| | | |
|---|---|---|
| PATENT NO. | : 7,056,970 B2 | Page 1 of 1 |
| APPLICATION NO. | : 11/096421 | |
| DATED | : June 6, 2006 | |
| INVENTOR(S) | : Travis Honeycutt | |

It is certified that error appears in the above-identified patent and that said Letters Patent is hereby corrected as shown below:

Col. 8, Ln. 7, Delete "allergencity"
                Insert --allergenicity--

Signed and Sealed this
Fourteenth Day of June, 2011

David J. Kappos
*Director of the United States Patent and Trademark Office*